July 20, 1965     T. S. VOORHEIS ETAL     3,195,608
VOLATILE WASTE INCINERATOR

Filed April 8, 1963     4 Sheets-Sheet 2

INVENTORS
Temple S. Voorheis
Ralph R. Vosper
BY
Townsend and Townsend
attorneys

July 20, 1965 T. S. VOORHEIS ETAL 3,195,608
VOLATILE WASTE INCINERATOR
Filed April 8, 1963 4 Sheets-Sheet 3
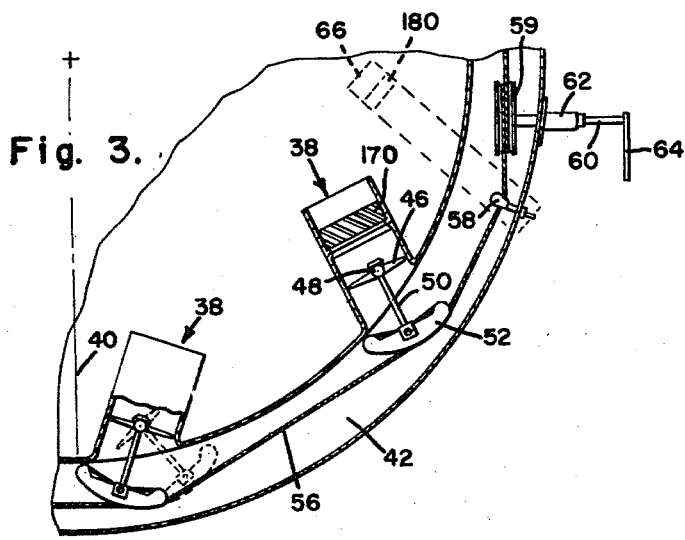
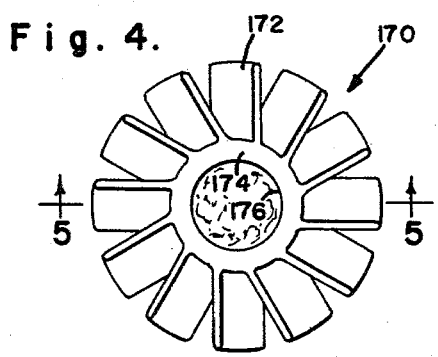
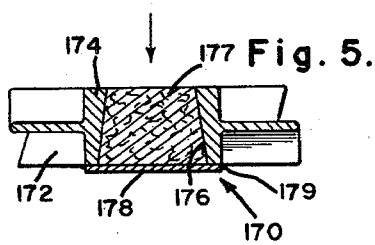
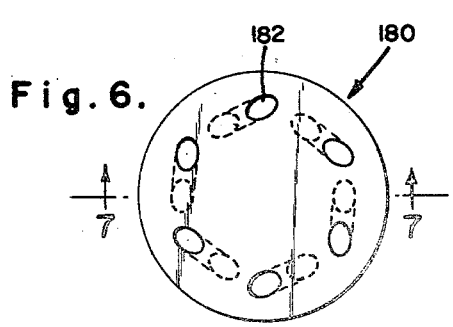
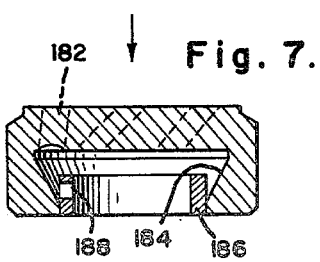
INVENTORS
Temple S. Voorheis
Ralph R. Vosper
BY

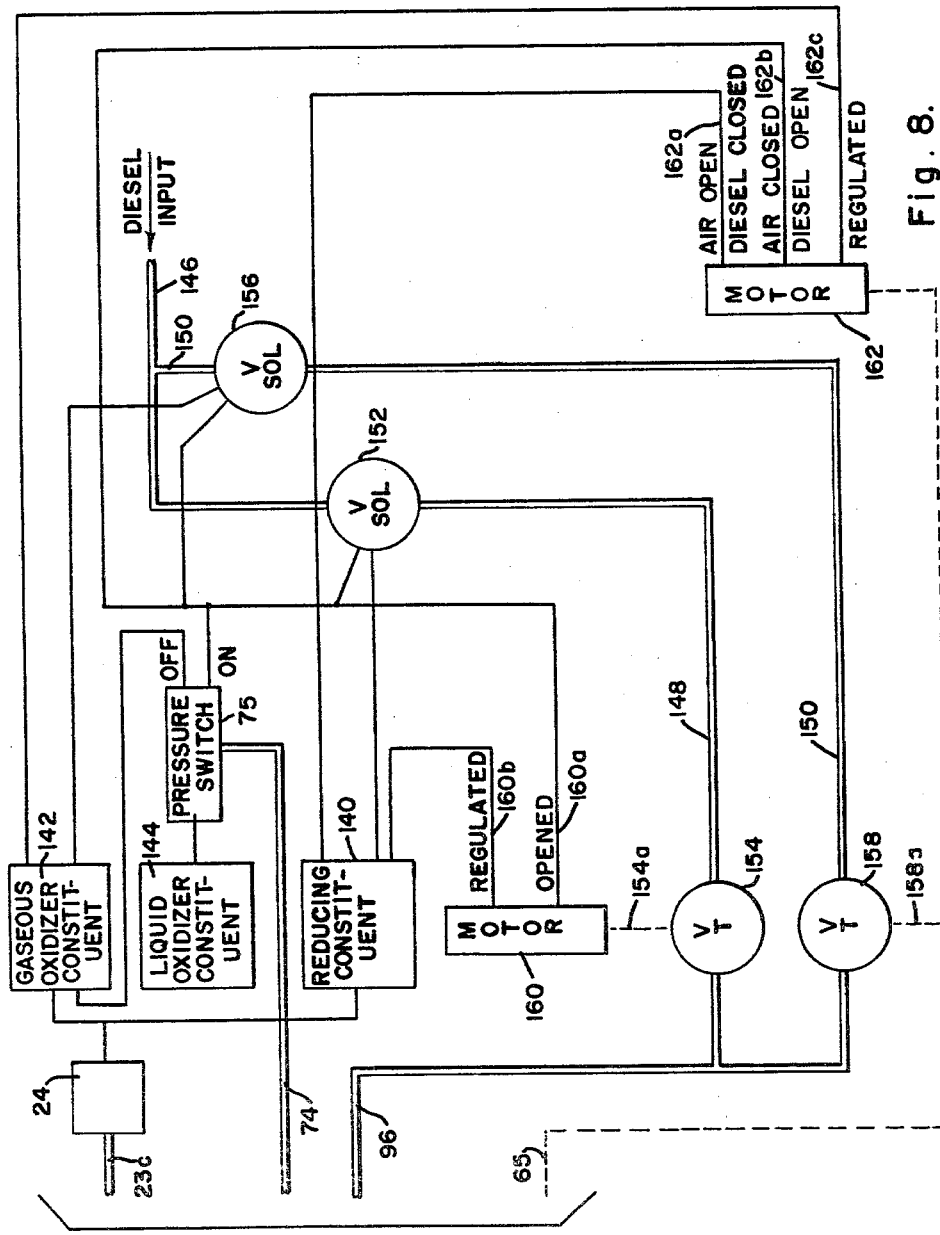

United States Patent Office 3,195,608
Patented July 20, 1965

3,195,608
VOLATILE WASTE INCINERATOR
Temple S. Voorheis, Palo Alto, and Ralph R. Vesper, Santa Clara, Calif., assignors to Coen Company Inc., San Francisco, Calif., a corporation of California
Filed Apr. 8, 1963, Ser. No. 271,082
8 Claims. (Cl. 158—5)

This invention relates to an incinerator for consuming volatile substances, and more particularly, to an incinerator for controllably consuming the reducing constituent and the oxidizing constituent of rocket fuel.

Waste substances that have high volatility or a tendency to explode and those that produce noxious air-polluting fumes present problems of disposal because of the aforementioned characteristics. Processes for disposal of such waste substances must be closely controlled in order to avoid explosion and emission into the atmosphere of noxious fumes.

Certain types of rockets have separate storage containers for the reducing constituent and the oxidizer constituent of the rocket fuel. The two constituents are combinable to produce a violent reaction that produces thrust to propel the rocket. One or both of the constituents frequently become contaminated by admixture of water therewith before the rocket is fired and must be drained from the rocket and safely discarded.

Therefore, it is an object of this invention to provide an incinerator for consuming volatile substances which incinerator is selectively adaptable to controllably consume either a reducing constituent or an oxidizing constituent. Associated with the apparatus is a controlled air supply for reacting with the reducing constituent and a reducing fuel supply for reacting with the oxidizer constituent. The apparatus generally includes a primary combustion chamber in which the main reaction takes place and an after-burner chamber disposed to receive the effluent from the combustion chamber. The after-burner chamber is provided with suitable means for assuring that the reaction is complete and that fumes emanating into the atmosphere contain no noxious or harmful substances.

Another object of the present invention is to provide a system in which highly volatile substances can be consumed at a controlled rate. This object is realized by providing apparatus that maintains relatively constant combustion conditions for a wide range of flow rates of the material to be consumed by adjusting the flow of the air, reducing fuel or other suitable reactant into the apparatus. Thus, the system is designed to compensate automatically for varying feed rates of the rocket fuel constituents while maintaining substantially constant combustion conditions.

Still another object is to provide apparatus that can controllably consume an oxidizer constituent of a rocket fuel that is in either gaseous or liquid form. This object is realized by providing a heat exchanger associated with the apparatus through which a liquid oxidizer constituent is conveyed to be vaporized. From the heat exchanger, the vaporized oxidizer is conveyed to the combustion chamber. The apparatus is arranged to by-pass the heat exchanger when oxidizer constituent in a gaseous form is to be consumed. The input heat for the heat exchanger is produced by the process taking place in the chamber. Thus, no special heating device is required to vaporize the liquid oxidizer constituent.

Yet another object is to provide a nozzle arrangement through which the various materials are fed into the combustion chamber, which nozzles are arranged in a manner to promote intermixing of the various components. This object is fulfilled by providing a substantially cylindrical combustion chamber and injecting the gaseous (oxidizer) components into the bottom of the chamber at a direction generally tangential to the interior cylindrical wall to cause a spinning or swirling condition in the bottom of the chamber. The reducing fuel or the reducing constituent of the rocket fuel is injected in liquid form above the swirling gaseous oxidizer mass and is intimately intermixed therewith as the liquid falls through the swirling mass. Moreover, the oxidizer material, whether it be the oxidizer constituent of the rocket fuel or air, is fed into the combustion chamber through special nozzles that impart a spiral motion as well as a swirling motion. Complete intermixture of the reducer and oxidizer promotes a more complete combustion reaction.

A further object is to provide an afterburner for receiving the effluent from the combustion chamber to completely react any noxious substances in the effluent of the combustion chamber. The afterburner is provided to afford more resistance time for the effluent in an atmosphere of oxygen abundance. Any inflammable or toxic substances that have not been consumed in the combustion chamber are thus combined with oxygen in the afterburner. A surplus of air in the afterburner cools the combustion products emitted into the atmosphere.

Yet a further object is to provide a novel apparaus for feeding air into the combustion chamber and regulating the rate of flow of the air. More complete combustion is assured by feeding air through a plurality of ports arranged about the periphery of the combustion chamber. Each port is provided with a damper valve and each damper valve is linked to a single control means by a novel cable linkage device. Thus, operation of the single control means moves each damper valve an equal amount to adjust uniformly each air port.

A still further object is to provide a method for consuming extremely volatile substances at a safe, controllable temperature. Fulfillment of this object includes spraying water directly into the combustion chamber while the process is taking place.

These and other objects will be more apparent after referring to the following specification and attached drawings in which:

FIGURE 1a is a partial cross-sectional elevational view of a volatile waste incinerator according to the present invention;

FIGURE 1b is a partial cross-sectional elevational view of the volatile waste incinerator showing interior portions opposite FIGURE 1a;

FIGURE 3 is a partial cross-sectional plan view taken substantially along line 3 of FIGURE 1b;

FIGURE 4 is an elevation view of an air spinner according to the present invention;

FIGURE 5 is a plan view in cross-section taken along 5—5 of FIGURE 4;

FIGURE 6 is an elevation view of an oxidizer spinner nozzle according to the present invention;

FIGURE 7 is a cross-sectional plan view taken along 7—7 of FIGURE 6; and

FIGURE 8 is a schematic diagram of the temperature and flow controlling system of the present invention.

Figure 1:
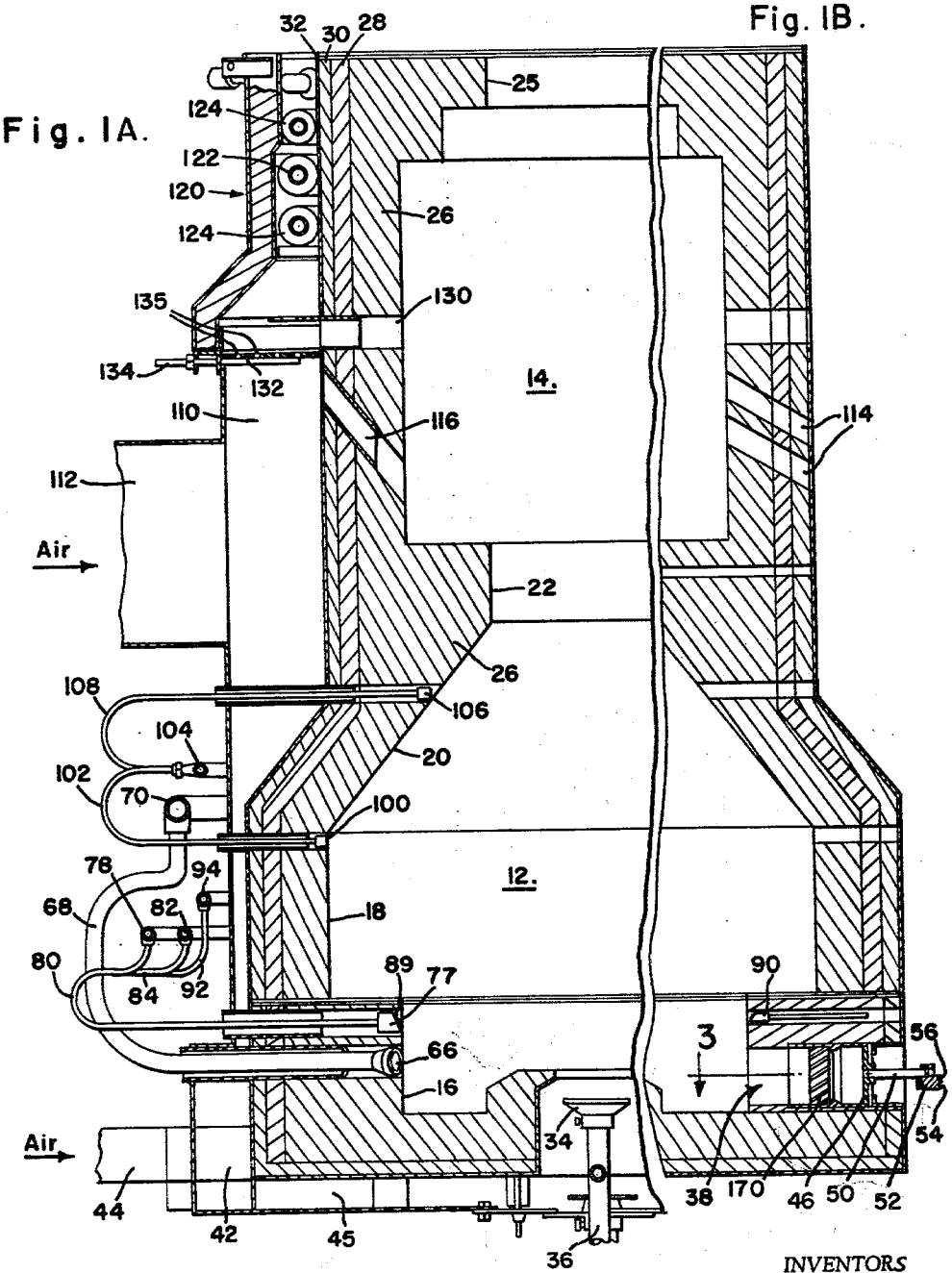
Figure 2:
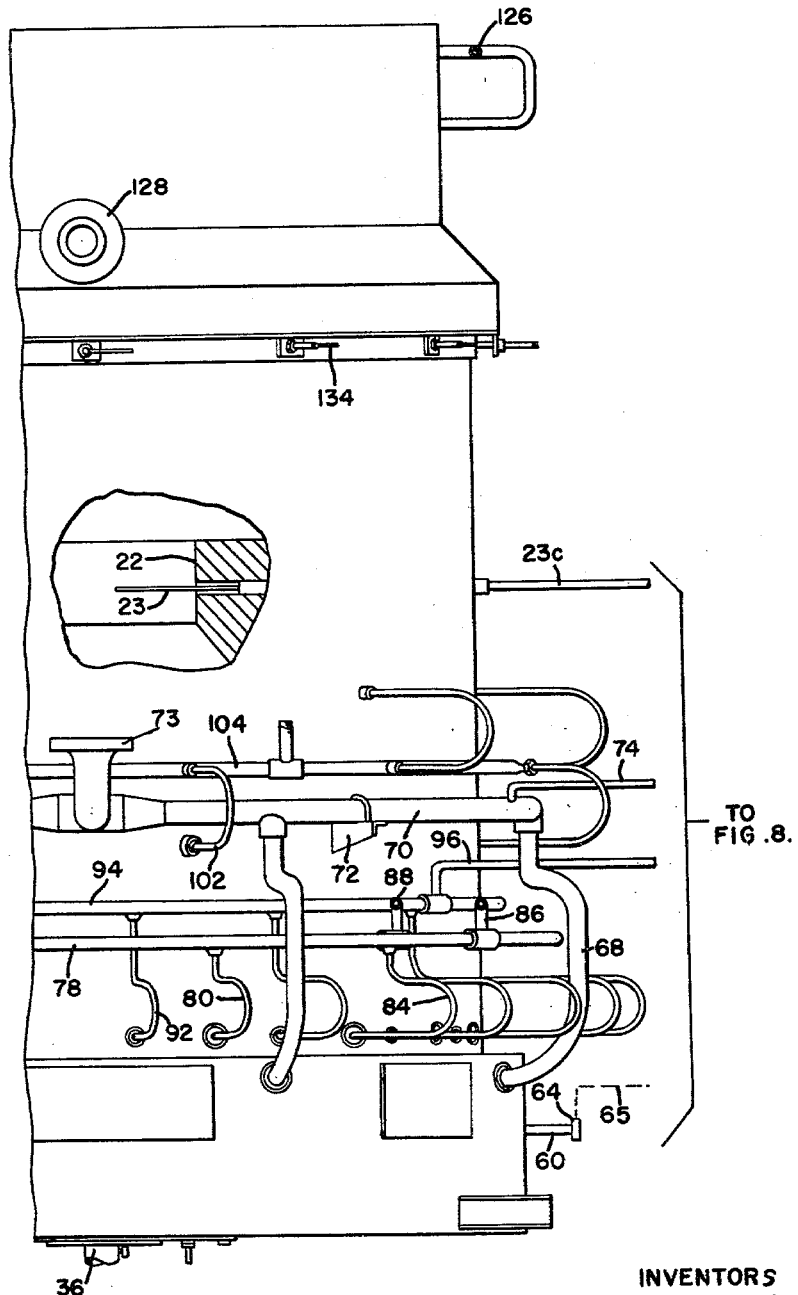
FIGURE 2 is a partial elevational view of the exterior of the volatile waste incinerator partially broken away.

Referring more particularly to the drawings, reference numeral 12 indicates a refractory lined combustion chamber having an after-burner chamber 14 mounted thereabove. Combustion chamber 12 includes a lower cylindrical portion 16, an intermediate cylindrical portion 18 mounted above the lower cylindrical portion and having a greater diameter than the lower portion, and an upper portion 20 formed with an upwardly and inwardly extending frusto-conical wall formed at the top end thereof with an outlet opening 22 that leads into after-burner chamber 14. Within the outlet passage 22 is disposed a thermocouple 23 that senses the temperature of the process taking place within combustion chamber 12. Connected to the output of thermocouple 23 via a cable 23c is a conventional electronic bridge type controller unit shown schematically at 24 (FIG. 8). Controller 24 generates an output signal proportional to the temperature sensed at thermocouple 23. The upward end of after-burner chamber 14 has a restricted opening 25 therein for increasing the pressure somewhat in the after-burner chamber. Both combustion chamber 12 and after-burner chamber 14 are lined with a plastic refractory layer 26 that is backed by a layer of refractory bricks 28 and a layer of insulating block 30. An outer shell of structural material 32, such as steel or the like, supports the heat resistant materials.

Axially disposed in lower portion 16 of combustion chamber 12 is an axial burner 34 that is supplied with diesel fuel or the like through a pipe 36. Axial burner 34 is adapted to pre-heat the refractory lining to a temperature sufficient to prevent destruction of the refractory lining when the incinerating process is starting; the axial burner also serves to light off the combustibles fed into the combustion chamber and to stabilize the process. We have found that pre-heating the chamber by use of axial burner 34 materially lengthens refractory life. The cylindrical sidewalls of lower portion 16 of the combustion chamber are formed with a plurality of spaced apart air ports 38 around the entire periphery thereof. Each air port is angularly disposed from a radial line 40 in order that a swirling motion is produced in the lower portion of combustion chamber 12. Each air port 38 communicates with a peripheral air duct 42 that is supplied with air from a conduit 44 from a conventional fan or blower source, not shown. A branch duct 45 supplies air to axial burner 34. Each air port 38 has a damper valve 46 therein pivotally mounted on a shaft 48. A lever arm 50 is attached to damper valve 46 and has fixed to its outer end a generally crescent shaped drive member 52. The outer periphery of crescent shaped member 52 is provided with a notch 54 for receipt of a drive cable 56. Spaced around the interior of peripheral duct 42 are pulleys 58 for supporting cable 56. Cable 56 terminates at a damper drive sheave 59 that is mounted on a shaft 60, which shaft is journaled for rotation in a suitable bearing 62. A crank arm 64 on the outer end of shaft 60 is provided for attachment to a link 65 from a control system to be described hereinbelow.

Disposed alternately with air ports 38 are nozzles 66 for feeding the oxidizer constituent into the afterburner. Nozzles 66 are situated at about the same level as air ports 38. As is more clearly shown in FIGURE 3, nozzles 66 are arranged obliquely to a radial direction in order that the oxidizer will describe a swirling path in the bottom of lower portion of combustion chamber 12. The oxidizer is fed to each nozzle 66 through a tube 68 that communicates with a header 70 disposed at a level higher than nozzles 66. Tube 68 at the bottom end thereof describes a substantially horizontal path so that the tube is drained by gravity and no oxidizer constituent is entrapped within the tube. Header 70 is supported in any suitable manner, such as by brackets 72 attached to exterior wall 32 of the apparatus. Oxidizer constituent in gaseous form is supplied to header 70 through a conventional flanged fitting 73.

Communicating with header 70 via a conduit 74 is a conventional pressure switch 75 (FIG. 8). Pressure switch 75 is arranged to remain in an "OFF" condition until the pressure in header 70 rises to a preselected amount, at which time the switch assumes an "ON" condition. A decrease in header 70 to a pressure below the preselected pressure restores switch 75 to the "OFF" condition. The function of pressure switch 75 in the control system of the present invention is described in detail below.

A plurality of nozzles or spouts 77 for injecting fuel reducing constituents into combustion chamber 12 is provided around the periphery of lower portion 16 above oxidizer nozzle 66 and air ports 38. Alternate spouts 77 are connected to a header 78 by tubes 80 and a header 82 via tubes 84. Header 78 has an inlet 86 and header 82 has an inlet 88 for feeding the reducing constituent to the respective headers. Tubes 80 and 84, which connect respective headers to spouts 77, each have a horizontal portion at the lower end thereof to assure that all liquid will be drained from the tubes by gravity when the apparatus is turned off. Each spout 77 preferably has jets 89 therein that are adapted to spray the reducing constituent along a path that is slightly above horizontal with the result that the reducing constituent has a longer path through which to fall and is therefore more intimately intermixed with the swirling air.

Between adjacent reducing constituent spouts 77, and at about the same level as the spouts, is a plurality of inlets 90 for injecting a reducing fuel such as diesel oil into the chamber for reacting with the oxidizer constituent and for controlling temperature when reducing constituent is being consumed. Inlets 90 are connected by way of suitable tubes 92 to a header 94 which is provided with an input conduit 96 into which diesel oil is fed in a controlled manner explained in detail hereinbelow.

In the wall of intermediate portion 18 of combustion chamber 12 is a plurality of water guns 100 that are connected via tubes 102 to a water header 104. In upper portion 20 of combustion chamber 12 is a plurality of water guns 106 that are connected to header 104 via a tube 108. Water sprayed from guns 100 and 106 into the combustion chamber limits the temperature of the process and thus insures longer life of the refractory lining of the chamber.

Surrounding the apparatus at a vertical level somewhat above the combustion chamber is an upper wind box 110. Air is supplied to wind box 110 through a duct 112 from a suitable blower, not shown. Upwardly sloping air passages 114 and downwardly sloping air passages 116 are provided through the walls of the after-burner for air communication between wind box 110 and after-burner chamber 14. Provision of both upwardly directed air passages and downwardly directed air passages into after-burner chamber 14 promotes turbulence within the chamber and mixture of the gases therein.

Oxidizer constituents in liquid form, such as nitrogen tetroxide ($N_2O_4$), can also be consumed by apparatus of the present invention. The liquid oxidizer is converted to vapor after which it is fed to oxidizer header 70 for injection into the combustion chamber through nozzles 66. For vaporizing the liquid oxidizer constituent we provide, spirally circumscribing the exterior of after-burner chamber 14, a heat exchanger 120 which includes a spiral tube 122 having attached to the outer surface thereof a plurality of fins 124. Tube 122 has a liquid inlet fitting 126 and an output gas fitting 128. Conventional means not shown are provided for conducting the gaseous oxidizer material from output fitting 128 to flanged fitting 73 on oxidizer header 70. Gas passages 130 are provided in the side wall of after-burner chamber 14 for directing hot gases over fins 124 on pipe 122. Because of the restricted top opening 25 in after-burner chamber 14, there is sufficient pressure in the after-burner chamber to drive gases in the after-burner through opening 130. A plurality of unloader dampers 132 form the top partition of wind box 110, each damper being pivotally mounted on a shaft 134. The dampers are apertured at 135 to admit a small flow of air to the heat exchanger even when dampers 132 are in the closed (horizontal) position.

Operation of heat exchanger 120 is effected by closing dampers 132 to restrict air flow into the heat exchanger from wind box 110. The pressure in the volume surrounding heat exchanger pipes 122 thereby decreases below the pressure in after-burner chamber 14, thus permitting fuel rich gases from the after-burner chamber to pass through opening 130 into the heat exchanger.

Because the gases are hot, fins 124 and pipes 122 are heated and the liquid oxidizer within pipe 122 is vaporized. Moreover, because the gases passing through passage 130 are fuel rich, combustion takes place in the volume surrounding the vaporizer pipes 122 owing to the entry of air through apertures 135. As a consequence, additional heat is conveyed to the oxidizer within the pipes. When the oxidizer has been vaporized, it is conveyed down to header 70 and consumption of the oxidizer proceeds in a regulated fashion as described hereinafter.

The control system of the present invention adjusts the inflow of air and diesel fuel in accordance with the temperature sensed by thermocouple 23, the pressure existing in oxidizer header 70 and the type of material (reducing constituent, gaseous oxidizer constituent or liquid oxidizer constituent) being consumed in the combustion chamber. Referring to FIGURE 8, reference character 140 schematically designates a mode selector circuit which, when actuated, prepares the system for the consumption of a reducing constituent such as aerosene. Aerosene is a widely used reducing constituent and consists of about a 50/50 mixture of hydrazine and unsymmetrical dimethyl hydrazine. For selecting a mode of operation in which a gaseous oxidizer constituent, such as nitrogen dioxide ($NO_2$), is consumed, a mode selector circuit designated schematically at 142 is provided. A third mode selector circuit 144 is provided for establishing control conditions necessary when consuming a liquid oxidizer constituent, such as nitrogen tetroxide ($N_2O_4$). Mode selector circuits 140, 142 and 144 are so arranged that only one can be in operation at a given time.

Diesel oil from a source not shown is supplied under pressure to a fuel line 146 which conveys fuel to branch lines 148 and 150. Interposed in branch line 148 is a solenoid valve 152 that remains closed until electrically energized. A throttle valve 154 is also interposed in branch line 148 and is provided with a shaft 154a, the position of which determines the amount of flow through the valve into conduit 96. Branch line 150 is provided with a solenoid valve 156 of a type substantially identical to valve 152 and a throttle valve 158 substantially identical with valve 154. Valve 158 is provided with a shaft 158a for regulating the diesel flow through the valve. Of course, throttle valves 154 and 158 are effective to control diesel flow only if solenoid valves 152 or 156, respectively, are opened. Branch lines 148 and 150 converge into input conduit 96.

A conventional control motor 160 is provided for positioning shaft 154a to regulate the flow of diesel oil through valve 154. Motor 160 is provided with an input terminal 160a, energization of which moves valve 154 to the full open position, and an input terminal 160b which is adapted to receive a signal that varies in accordance with the temperature sensed in the chamber by thermocouple 23. Such variation, of course, adjusts the diesel flow through valve 154. Motor 160 is arranged so that diesel flow through valve 154 is increased in response to a temperature decrease in the combustion chamber.

A second valve control motor 162 is attached to shaft 158a of throttle valve 158 to control the diesel flow therethrough. Motor 162 is also connected to link 65 associated with air damper valves 46. Link 65 is arranged in respect to shaft 158a so that when air flow into the combustion chamber is decreased, diesel flow through valve 158 is increased, and vice versa. Motor 162 is provided with an input terminal 162a which, when energized, causes the motor to close valve 158 and open the air damper valves through link 65. Motor 162 has a second input terminal 162b, energization of which causes the motor to fully open valve 158 and fully close damper valves 46. A third input terminal 162c on motor 162 is adapted to receive a signal that varies in accordance with the temperature sensed by thermocouple 23 and simultaneously to close valve 158 and open air damper valves 46 when the temperature exceeds a preselected set point. When the temperature is less than the preselected set point, a signal applied to terminal 162c indicating such condition simultaneously opens valve 158 and closes air damper valves 46.

Operation of the apparatus will first be considered for the case when a reducing constituent is to be consumed. Aerosene is an exemplary highly reactant material that can be safely destroyed in the apparatus of the present invention. Aerosene to be destroyed is sometimes substantially pure and is sometimes contaminated with large amounts of water. In the event that substantial water is present and constitutes 60% or more by volume of the liquid to be disposed, the liquid is conveyed to both headers 78 and 82 for injection through nozzles 77 into combustion chamber 12. If a lower percentage of water is present, the contaminated reducing constituent is supplied through only one header, for example, header 78, and cooling water is fed through the other header 82 into the combustion chamber.

In consuming waste materials the combustion chamber is first preheated by axial burner 34. Mode selector circuit 140 is operated, and the reducing constituent is applied to one or both of headers 78 and 82. An electric signal proportional to the temperature sensed by thermocouple 23 is developed by electronic bridge controller 24, which signal is applied through mode selector 140 to terminal 160b of motor 160. Mode selector circuit 140 also transmits a signal to solenoid valve 152 to open the valve. Therefore, the diesel flow through branch line 148 is regulated in accordance with varying temperatures within the combustion chamber. Mode selector circuit 140 also applies a signal to terminal 162a of motor 162 so that air dampers 46 are moved to the fully open position. As the inflow of reducing constituent varies as sensed by the temperature existing at thermocouple 23, the inflow of diesel fuel is varied to compensate for the change and to maintain a substantially constant temperature.

To consume a gaseous oxidizer material, the combustion chamber is first preheated as described above. Mode selector 142 is energized and the gaseous oxidizer constituent is applied to flanged fitting 73 on header 70 for injection into the combustion chamber through nozzles 66. Mode selector circuit 142 applies a signal to solenoid valve 156 to open the valve and applies to terminal 162c of motor 162 a signal the magnitude of which varies as the temperature sensed at thermocouple 23 varies. Thus, the rate of diesel inflow through header 94 is controlled by valve 158, and the rate of air inflow is controlled through link 65 by air dampers 46. As the input rate of oxidizer constituent varies the temperature in the combustion chamber varies. Temperature increase will act through thermocouple 23, electronic bridge circuit 24, and control motor 162 to decrease the rate of diesel flow through valve 158 and to increase the air entering the combustion chamber through dampers 46. Should a decrease in temperature be sensed by thermocouple 23, opposite action will occur. Of course, during the combustion process water is injected through guns 100 and 106 to maintain a safe temperature within the combustion chamber.

In consuming waste liquid oxidizer constituents conversion of the liquid to a gaseous form is first accomplished. The liquid oxidizer constituent is applied to inlet fitting 126 on heat exchanger 120 and the vaporized material is then conveyed from output fitting 128 by a conventional piping system (not shown) to flanged fitting 73 on header 70. After the combustion chamber is preheated by axial burner 34, dampers 132 are rotated to restrict air flow into the heat exchanger region. Mode selector circuit 144 is actuated, and at the beginning of the process, combustion proceeds in a manner identical to the gaseous oxidizer constituent mode described above. Such is the case, because on initiation of the process, heat exchanger 120 has not reached full efficiency as a consequence of which the vaporized oxidizer constituent conveyed to header 70 is of insufficient pressure to operate pressure switch 75. As the temperature in the heat exchanger increases, the pressure of vaporized oxidizer fed into header 70 increases; when a preselected pressure is reached, pressure switch 75 is turned to the "ON" position. As a consequence of actuation of pressure switch 75, both solenoid valves 152 and 156 are opened and motors 160 and 162 move valves 154 and 158, respectively, to the full open position. Air entering through dampers 46 is stopped by closure of the dampers. Thus, a full flow of diesel fuel through line 96 occurs. Should the pressure of the vaporized oxidizer in header 70 decrease below the preselected value, pressure switch 75 will be turned off, and the system operation will revert to the gaseous oxidizer constituent mode of operation.

Because the present invention resides primarily in the construction and configuration of the incinerator per se, the above description and disclosure of the system control elements including temperature controller bridge 24, pressure switch 75, and mode selector circuits 140, 142, 144, are done in schematic form for the purpose of illustrating how the incinerator functions during the various modes of operation. Since these elements are conventional and well known in the art, such showing is adequate for the full understanding of the invention.

Complete consumption of the rocket fuel constituents requires intimate mixing in the combustion chamber of the materials fed into the chamber. During consumption of the reducing constituents, such intermixing is promoted by providing an air spinner 170 in each air port 38. Air spinner 170 is formed with a plurality of fins 172 radiating outwardly from a centrally disposed cylindrical member 174 having a tapered opening 176 therethrough. Refractory material 177 is packed into opening 176 and is secured therein by a plate 178 welded to the spinner at 179. Plate 178 is stainless steel or a similar high strength, heat resistant material. Fins 172 are formed with generally flat surfaces and are disposed obliquely relative to the flow of air through the spinner. Thus, air impinging on the obliquely sloping surfaces of fins 172 will be deflected against the interior surface of air port 38 and a spiral motion of the air ensues. Liquid reducing materials falling through the swirling air mass will be intimately mixed therewith and more complete combustion obtained.

When the apparatus is being operated in a mode to consume the oxidizer constituent, intimate mixture of the oxidizer with the reducing fuel from spouts 90 is promoted by providing in the aperture of each oxidizer nozzle 66 an oxidizer gas spinner 180. The body of spinner 180 has a plurality of angularly disposed passages 182 therein through which oxidizer gas is conveyed. The slope of the passages causes the gas passing therethrough to define a generally spiral path. The body of spinner 50 is formed at the output end of passages 182 with an inwardly sloping wall 184 against which the gas flowing through the passages impinges. Turbulence is thereby added to the gas. Inserted in the output end of the nozzle is a cylindrical sleeve 186 that has a plurality of radial holes 188 therethrough communicating between the volume adjacent inwardly sloping surface 184 and the interior of cylindrical sleeve 186. Part of the gas flowing through passages 182 passes through holes 188 with a radial component of force; part of the gas flowing through passages 182 flows over the edge of cylindrical sleeve 186 with an axial component of force. Thus, the gas flowing from the spinner 180 into the combustion chamber is sufficiently turbulent to assure thorough intermixing of the oxidizer with the reducing fuel.

While one embodiment of our invention has been shown and described, it will be apparent that other adaptations and modifications may be made without departing from the spirit and scope of the invention.

What is claimed is:

1. Apparatus for selectively separately consuming reducing constituents and gaseous oxidizing constituents of a rocket fuel under controlled temperature conditions comprising a combustion chamber, means for preheating said combustion chamber, means for injecting an oxidizing constituent into said chamber, means for injecting a reducing fuel into said chamber, means for controlling the rate at which said reducing fuel injecting means injects reducing fuel into said chamber, means for injecting air into said chamber, means for controlling the rate at which said air injecting means injects air into said chamber, means for injecting the reducing constituent into said chamber, means for sensing the temperature of the interior of said chamber, means for selectively connecting said temperature sensing means to said reducing fuel injecting rate controlling means and said air injecting rate controlling means, an after-burner chamber in communication with said combustion chamber, and means for introducing sufficient air into said after-burner chamber to exceed an amount necessary to completely oxidize effluents conveyed thereto from said combustion chamber, whereby when the oxidizing constituent, air, and reducing fuel are injected into said combustion chamber the mixture thereof is ignited by said preheating means and the temperature as sensed by said temperature sensing means is controlled by controlling the rate at which reducing fuel and air are injected into said combustion chamber, and when the reducing constituent, reducing fuel and air are injected into said combustion chamber the mixture thereof is ignited by said preheating means and the temperature as sensed by said temperature sensing means is controlled by controlling the rate at which reducing fuel is injected into said combustion chamber, the combustion products of said combustion chamber being conveyed to said after-burner chamber.

2. Apparatus according to claim 1 in combination with a heat exchanger in heat communication with said after-burner chamber and means for selectively connecting said heat exchanger to said oxidizing constituent injecting means, whereby a liquid oxidizer constituent is fed through said heat exchanger for conversion thereof to gaseous form for injection into said combustion chamber by said oxidizing constituent injecting means.

3. Apparatus according to claim 1 in combination with means responsive to a preselected pressure of gaseous oxidizing constituent furnished to said oxidizing constituent injecting means for causing said air injecting rate controlling means to inject air into said chamber when the gaseous oxidizing constituent is below the preselected pressure and to close said air injecting means when the gaseous oxidizing constituent is above the preselected pressure.

4. Apparatus according to claim 1 in which said oxidizing constituent injecting means, said reducing constituent injecting means, and said reducing fuel injecting means each include substantially horizontally disposed pipes extending through the walls of said combustion chamber and a nozzle on the end of said pipe in the interior of said chamber, said nozzles being adapted to be purged of liquid therein by the force of gravity acting on whatever liquid remains in said horizontal pipes when operation of the apparatus is discontinued.

5. An incinerator that is selectively convertible to controllably consume a reducing material or an oxidizer gas comprising a combustion chamber and an after-burner chamber, said combustion chamber having a lower portion formed with a substantially vertically aligned cylindrical inner wall, an intermediate portion formed with a substantially cylindrical vertical wall above said lower portion and concentric therewith, said intermediate portion having a greater inner diameter than said lower portion, an upper portion having an upwardly and inwardly extending frusto conical wall adapted to form a restricted upper outlet for said combustion chamber, axial burner means for preheating said chambers, said chamber preheating means being axially disposed in the bottom of said lower portion, a plurality of spaced apart ports for tangentially injecting air into the lower portion of the combustion chamber, means for controlling the quantity of air injected into the combustion chamber by said air injecting ports, a plurality of nozzles for tangentially injecting oxidizer gas into the lower portion of the combustion chamber, said oxidizer nozzles being disposed between adjacent air ports at substantially the same vertical level as said air ports, first and second groups of spaced apart spouts for injecting fluid reducing material into said lower portion of said combustion chamber, said spouts being disposed at a level above said oxidizer nozzles and being adapted to inject fluid reducing material into said combustion chamber at an upwardly inclined angle, first and second headers circumscribing the exterior of said combustion chamber for conveying fluid to said first and second spout groups respectively, a plurality of fuel inlets for introducing a reducing fuel into the interior of said combustion chamber, said inlets being disposed between and adjacent said spouts substantially uniformly about said combustion chamber and being adapted to introduce fuel into said chamber at an upwardly inclined angle, means for regulating the rate of fuel flow through said fuel inlets, a plurality of lower water guns for spraying cooling water into the intermediate cylindrical portion of said combustion chamber, a plurality of upper water guns for spraying cooling water into the upper portion of said combustion chamber; said after-burner chamber being disposed above and coaxially with said combustion chamber, said after-burner chamber having a substantially cylindrical inner wall with a greater diameter than the diameter of the restricted upper outlet of said combustion chamber, a restricted orifice at the top end of said after-burner chamber, and a plurality of air inlets in the wall of said after-burner chamber, means for sensing temperature in the upper outlet of said combustion chamber, and means for selectively connecting said temperature sensing means to said fuel flow rate regulating means and said air quantity controlling means.

6. Apparatus according to claim 5 wherein said oxidizer gas injecting nozzles include means for producing a spiral motion to the oxidizer gas injected thereby comprising means forming an aperture in said nozzle, a body mounted in said aperture having a plurality of angularly disposed oxidizer gas passages therethrough, each said passage having an input end and an output end, said output end being angularly displaced around said body from said input end, means forming an inwardly sloping wall adjacent the output ends of said passages, said sloping wall defining an oxidizer gas discharge opening at its inner end, and a cylindrical sleeve mounted in said discharge opening, said sleeve being formed with a plurality of radially disposed holes therein for inducing a radial component of force to the oxidizer gas, whereby part of the oxidizer gas passing through said passages spills over the edge of said cylindrical sleeve and part of the oxidizer gas passes through the radial holes in said sleeve.

7. Apparatus according to claim 5 wherein each one of said air ports includes means for producing a spiral motion to the air injected into the combustion chamber through said ports, said spiral motion producing means comprising a centrally disposed cylindrical member formed with an opening therethrough substantially aligned with the direction of air flow through said port, a plurality of fins extending outwardly from said cylindrical member, said fins being obliquely disposed relative to the direction of air flow through said port, whereby air injected through said port is deflected into a spiral path by said oblique fins.

8. Apparatus according to claim 7 including refractory material fixedly mounted in the opening formed in said cylindrical member.

References Cited by the Examiner
UNITED STATES PATENTS

| | | | |
|---|---|---|---|
| 901,232 | 10/08 | Eldred | 110—28 X |
| 2,042,058 | 5/36 | Jefferson | 158—4 |
| 2,417,835 | 3/47 | Moore | 158—4 X |
| 2,594,206 | 4/52 | Payne | 158—1 |
| 3,047,371 | 7/62 | Krause et al. | 23—277 |

JAMES W. WESTHAVER, *Primary Examiner.*

MYER PERLIN, *Examiner.*